United States Patent [19]
Logan

[11] 3,838,258

[45] Sept. 24, 1974

[54] STEP MOTOR CONTROL SYSTEM
[75] Inventor: David J. Logan, Glastonbury, Conn.
[73] Assignee: The Gerber Scientific Instrument Company, South Windsor, Conn.
[22] Filed: Feb. 18, 1972
[21] Appl. No.: 227,686

Related U.S. Application Data
[63] Continuation of Ser. No. 10,216, Feb. 10, 1970, abandoned.

[52] U.S. Cl............ 235/151.11, 318/696, 340/172.5
[51] Int. Cl...................... G05b 19/40, G06f 15/46
[58] Field of Search............ 235/151.1, 151.11, 151; 340/172.5; 318/685, 696; 444/1

[56] References Cited
UNITED STATES PATENTS

| | | | |
|---|---|---|---|
| 3,231,801 | 1/1966 | Lang | 318/696 X |
| 3,359,474 | 12/1967 | Welch et al. | 318/696 |
| 3,425,038 | 1/1969 | Trousdale | 235/151 UX |
| 3,434,113 | 3/1969 | Wiley et al. | 235/151 X |
| 3,466,517 | 9/1969 | Leenhouts | 318/696 X |
| 3,475,667 | 10/1969 | Newell | 318/696 |
| 3,486,093 | 12/1969 | McArthur | 318/696 X |

*Primary Examiner*—Joseph F. Ruggiero
*Attorney, Agent, or Firm*—McCormick, Paulding & Huber

[57] ABSTRACT

A control system for a step motor includes a computer which controls the energization of the step motor in response to input information supplied thereto. The step motor is connected directly to the output register of the computer so that the computer has complete control of each increment of motion of the step motor, the motor increments being produced by the computer program without the aid of an external clock or feedback signals from the step motor or the part driven thereby. In order to match the stepping rate of the step motor to the higher rate at which the computer is able to generate incremental motion producing changes in the output word appearing in the output register, the computer program includes at least one wait loop which is performed following each change in the output word to provide a predetermined delay preceding the appearance of the next word change and to control the velocity of the motor. In operating the motor between two end points wait loops of different duration may be used during the starting and stopping phases in order to match the acceleration and deceleration loads imposed on the motor to its available torque at various different speeds.

9 Claims, 11 Drawing Figures

PATENTED SEP 24 1974
3,838,258
SHEET 2 OF 3
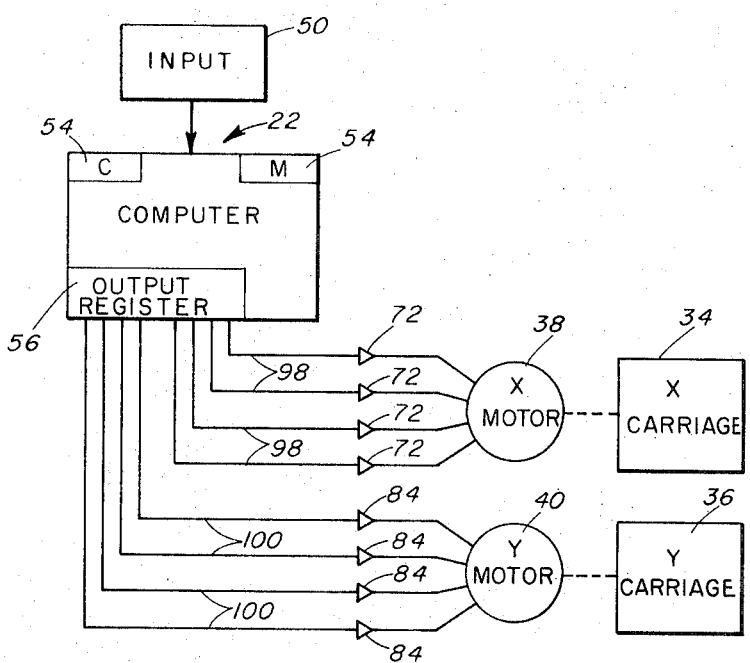
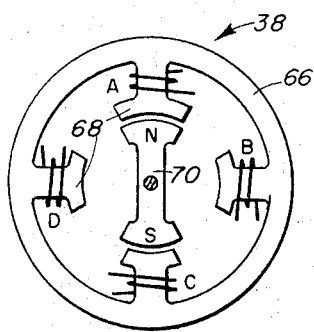
Fig. 3
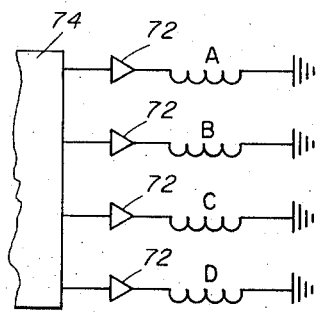
Fig. 4
Fig. 11
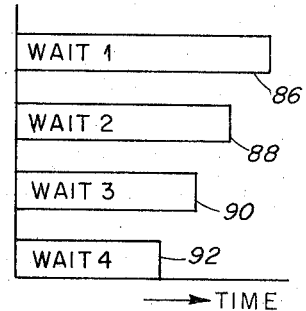
Fig. 7
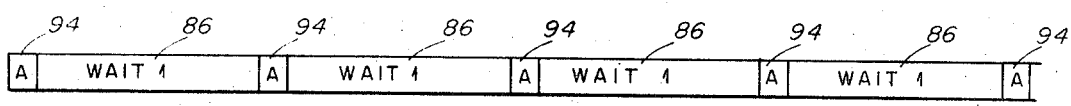
Fig. 8
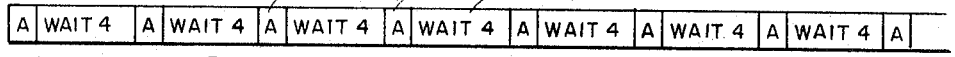
Fig. 9
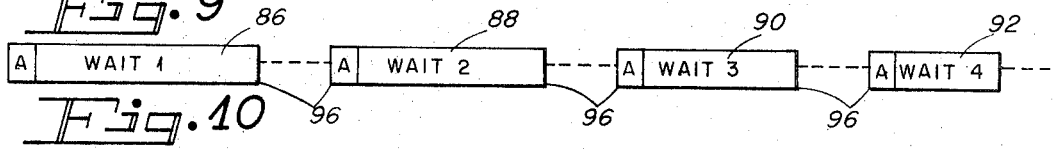
Fig. 10

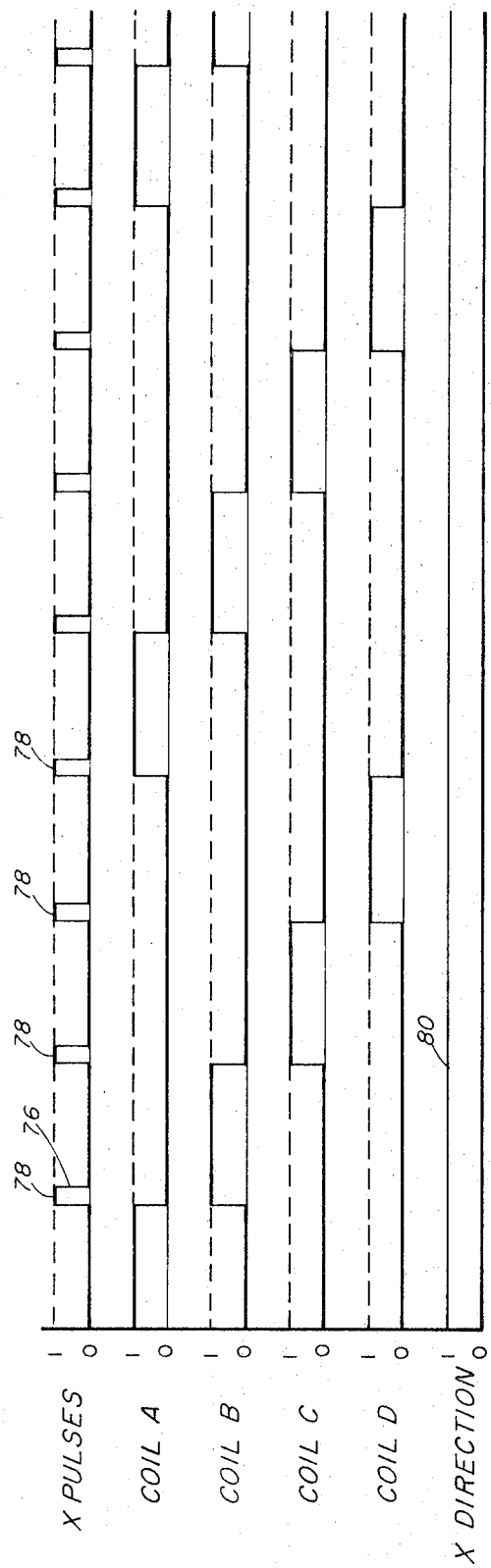
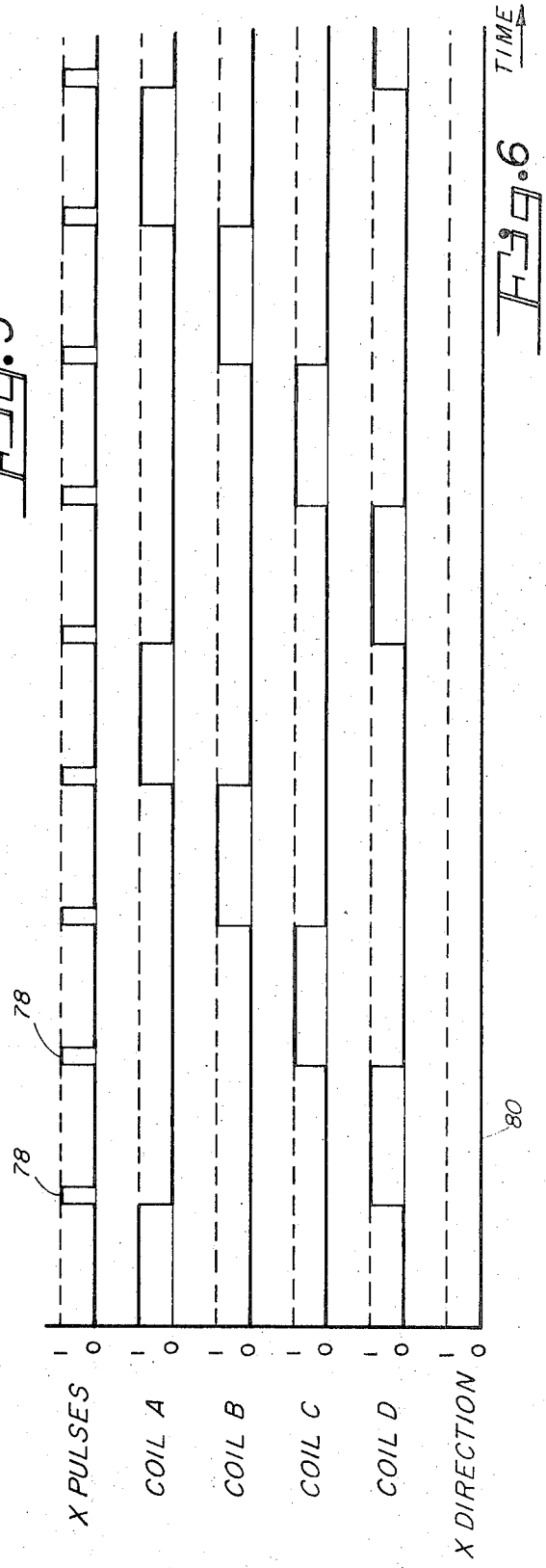

3,838,258

STEP MOTOR CONTROL SYSTEM

This is a continuation of application Ser. No. 10,216, filed Feb. 10, 1970 and now abandoned.

BACKGROUND OF THE INVENTION

This invention relates to automatic control systems wherein a given part is driven by an incremental motion motor, referred to as a step motor, which in turn is controlled by a data processor such as a general purpose computer, and deals more particularly with such a system, for operating a step motor wherein the step motor is directly responsive to changes in the output word appearing in the output register of the associated data processor.

Heretofore it has been known to utilize a general purpose computer or other similar data processor for controlling, concurrently with the operation of the computer and in response to calculations made thereby, an associated motor used to drive and position an associated driven part. For example, the part driven by the motor may be a valve for controlling the flow of a particular fluid in a chemical process with the computer possibly having as inputs thereto information concerning other parameters of the process. Also, and as shown herein by way of example, the driven part may be the input drive member for one of the two axes of a X-Y plotter such as shown in U.S. Pat. No. 3,473,009, the input drive member of the other axis also being driven by a similar motor controlled by the computer so that the pen or other output member of the plotter is driven along a given line or other course of movement dictated by the calculations made by the computer.

It has also been known in the past to specifically utilize step motors in systems such as those described above, but the maximum stepping rate of such motors is very much smaller than the maximum rate at which data processors are capable of generating stepping commands. A problem therefore exists in such systems of matching the operating rate of the motor to that of the computer. This problem has been solved in the past by using an external control or buffer between the computer and the step motor for controlling the operation of the computer so as to permit it to supply stepping commands only at a rate acceptable to the motor. For example, after one stepping command is generated by the computer and transmitted to the step motor the computer will not generate a new stepping command until receiving a feedback instruction to do so from the external control. This feedback signal authorizing the generation of a new stepping command by the computer in turn may be generated only in response to the detection by the external control of a quantity indicating that the stepping motor has responded fully to the preceding stepping command or may be generated by a separate clock in the external control from which clock the feedback signal is produced at such a time following the initial stepping command as to allow sufficient time for the stepping motor to respond thereto.

The system of this invention eliminates the need for an external control or buffer, effecting the operation of the computer, between the computer and the step motor, the step motor instead being directly connected to the output register of the computer and having no influence on the computer operation. The stepping commands, which appear as word changes in the computer output register, are, however, generated at a rate which is compatible with the stepping rate of the stepping motor, this being done by utilizing in the computer program wait loops of predetermined time duration which are performed following each calculation of a stepping command so as to provide a delay preceding the calculation of the next stepping command. This system and method not only eliminates the need for and the expense of the external control previously used between the computer and the step motor, but also by making the output rate of the stepping commands a readily programmable matter enables the rate of stepping commands to be varied at the will of the designer or programmer, as for example to match such rate of stepping commands to any one of a large number of different stepping motors that may be used in the system, or to shape the velocity versus time characteristic of the stepping motor motion as it is driven between two end points to any desired configuration. Such velocity versus time characteristic may, for example, include a linear or non-linear up-ramp portion at the starting phase of the motion and a linear or non-linear down-ramp portion at the terminal phase of the motion in order to fully utilize the capability of the motor by closely matching its available torque at given speeds to the acceleration and deceleration loads imposed on it at such speeds.

SUMMARY OF THE INVENTION

This invention resides in a system for controlling a step motor directly in response to changes in the word appearing in the output register of a data processor forming a part of the system. The step motor is directly connected with the output register and includes a plurality of windings which by having their energization scheme changed in a step-by-step manner cause the output member of the motor to rotate. The connection between the motor and the output register may be such that each winding is connected, through an amplifier, to a respective one of the positions of the output register so that such winding is energized when such position contains one binary such winding is energized when such position contains one binary digit and is de-energized when such position contains the other binary digit. Thus, the sequencing of the winding energization is under desired control of the program of the data processor. Alternatively, the motor windings may be connected to the computer through amplifiers and a decoder or sequencer with the decoder or sequencer in response to given changes in the output word appearing in the output register serving to change the energization scheme of the windings in a proper sequence to obtain movement of the motor in the desired direction. The time which elapses between incremental motion producing changes in the output word of the computer is controlled by the computer program which includes a number of time consuming wait loops at least one of which is inserted in the operating routine of the computer following each calculation of a motion producing word change. Acceleration and deceleration of the step motor as it is driven between two end points are controlled by varying the wait loops to produce up and down ramps in the velocity versus time characteristic of the motor.

BRIEF DESCRIPTION OF THE DRAWINGS

FIG. 3 is a schematic representation of one of the motors of FIG. 2.

FIG. 4 is a diagram illustrating the manner in which the windings of the motor of FIG. 3 are connected with the associated decoder.

FIG. 5 is a diagram illustrating the energization scheme of the X motor of FIG. 2 and the manner in which such energization scheme is changed in response to changes in the output word appearing in the output register of the computer to drive the motor in one direction.

FIG. 6 is a diagram similar to FIG. 5 but shows the manner in which the energization scheme of the associated motor changes as such motor is driven in the opposite direction.

FIG. 7 is a diagram illustrating the time duration of various different wait loops which may be used by the computer of FIG. 1.

FIG. 8 represents a program which may be used to rotate a motor slowly.

FIG. 9 represents another program which may be used to rotate a motor at a faster speed.

FIG. 10 illustrates a program which may be used to provide an acceleration of the associated motor.

FIG. 11 is a block diagram illustrating a system comprising an alternative embodiment of this invention and which may be used with the apparatus of FIG. 1.

DETAILED DESCRIPTION OF THE PREFERRED EMBODIMENTS

Figure 1:
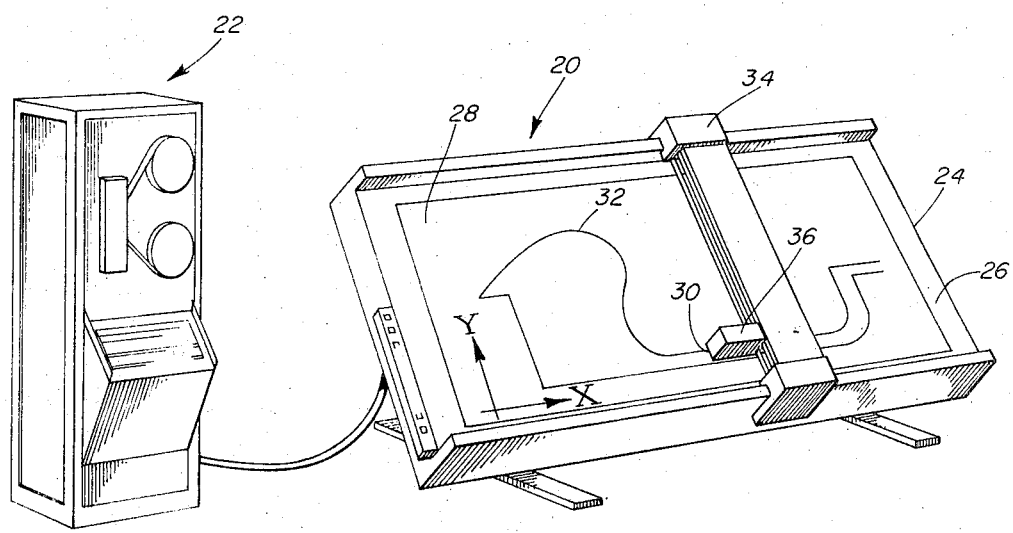
FIG. 1 is a perspective view of a computer and X-Y plotter embodying a control system and utilizing a method of this invention.

Turning to the drawings and first considering FIG. 1, the invention is shown by this figure as embodied in an automatic control system comprising basically an X-Y plotter 20 and a general purpose computer 22. The plotter 20 includes a table 24 having a flat supporting surface 26 for supporting a piece of paper 28 or other workpiece on which a series of lines or other graphic display is to be drawn by the pen 30 or other output member of the plotter, the graphic display in the illustrated case being shown at 32. Movement of the pen 30 in the X coordinate direction is obtained by movement in such direction of an X carriage 34 which spans the table 24 and which is suitably supported at both ends for movement in the X direction. Movement of the pen 30 in the Y direction is in turn provided by a Y carriage 36 which is supported by the X carriage 34 for movement relative thereto in the Y direction and which in turn carries the pen 30.

Suitable motors and associated drive trains, not shown in FIG. 1, are provided for driving the X carriage 34 in the X direction and the Y carriage 36 in the Y direction. In response to the operation of such motors the pen 30 therefore may be driven to any point on the plotter table and along any desired line on the workpiece 28. In accordance with the invention, these motors are incremental motion motors, commonly referred to as step motors, each of which includes a plurality of windings the energization scheme of which may be varied in a step-by-step fashion in order to obtain step-by-step motion of the output member thereof. In further accordance with the invention, these step motors are in turn connected with the output register of the computer 22 so as to be directly responsive to changes in the output word appearing in such register and without the computer being dependent for continued operation on the receipt of enabling signals fed back from the motors or other parts of the plotter.

The computer 22 of FIG. 1 may be of any well known construction and may take various different forms. As mentioned, however, it is preferably a general purpose computer and is one which operates in response to suitable input information to drive the pen of the plotter along a given line as dictated by such input information. This input information may, for example, consist of information concerning the coordinates of the end points of various line segments to which the pen is to be driven in order to synthesize, from such segments, a given longer an continuous line. The computer is also one which includes, as is conventional, an internal clock for controlling the timing of its operation and a storage or memory unit into which, among other things, a given program of operation may be stored.

Figure 2:
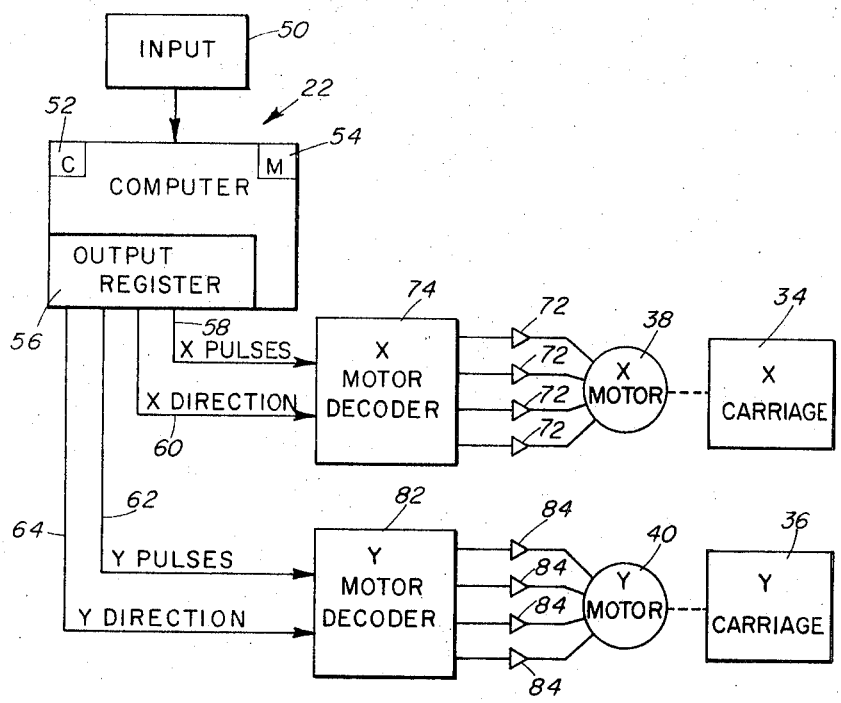
FIG. 2 is a block diagram of the system of FIG. 1.

FIG. 2 shows the system of FIG. 1 in block diagram form. As shown in this diagram, the motor for driving the X carriage 34 is indicated at 38 and the motor for driving the Y carriage 36 is indicated at 40. The computer 22 has associated therewtih an input device 50 which may take many different forms, such as a magnetic tape reader, a perforated tape reader, or a card reader, but the input device also by its is not pertinent to the invention. The computer also as shown in FIG. 2, includes an internal clock, indicated at 52, and a memory or storage device, indicated at 54. It also includes an output register 56 having a number of positions and in which appears a binary output word generated by the computer. Four positions of the output register are required for practicing the invention in accordance with the embodiment shown in FIG. 2 and, therefore, the output register 56 may be one having four or more positions. In the system shown in FIG. 2, the lines 58, 60, 62 and 64 are each connected with a respective one of the four positions of the output register 56 used in practicing this invention. Each of these lines is connected directly with the associated register position so that on it appears the same signal as appears in each associated register position to represent a binary digit. For example, in any one of the positions of the output register the binary digit zero may be represented by a zero voltage and the binary digit one may be represented by a positive voltage of predetermined value. Therefore, for example, when the position of the register associated with the line 58 contains a binary zero, a zero voltage appears on the line 58, and when such position contains a binary one, a positive voltage appears on such line. Accordingly, if the binary digit of said position is repeatedly changed back and forth between zero and one, a series of voltage pulses are produced on the line 58.

Considering the components of the FIG. 2 system associated with the X axis, the two lines 58 and 60 are used to control the associated X axis motor 38. As mentioned, this motor is a step motor, which means it is one the output member of which may be moved in a step-by-step fashion by changing the energization of its stator windings in a corresponding step-by-step fashion in accordance with a predetermined sequence. The form and construction of the motor actually used in the system may vary widely, but for the purpose of explanation, FIGS. 3 and 4 show in simplified form a suitable construction of the motor 38.

Referring to FIG. 3, the motor 38 there shown includes a stator 66 having four poles 68, 68 each receiving a respective one of four coils indicated at A, B, C and D. Cooperating with the stator 66 is a rotor 70 which is permanently magnetized so as to have a north magnetic pole at one end and a south magnetic pole at the other end, as shown. The stator coils are so wound on their associated poles 68, 68, and the energizing current is passed therethrough in such a direction, that when each coil is energized a south magnetic pole appears at the inner face of its associated pole. Therefore, from FIG. 3 it will be obvious that if the coils are energized in the sequence A, B, C, D the rotor 70 will rotate in the clockwise direction, whereas if the coils are energized in the sequence A, D, C, B, the rotor 70 will rotate in the counterclockwise direction.

The windings A, B, C, D of the motor 38 are energized by a group of respectively associated power amplifiers 72, 72 and through an associated X motor decoder or sequencer 74. The decoder 74 has as inputs thereto the signals appearing on the register output lines 53 and 60 and it operates in response to such signals to change the energization scheme of the windings of the motor 38 from one step to the next in the desired sequence in response to changes in the signal appearing on the line 58, and in a direction dictated by the signal appearing on the line 60.

The operation of the decoder 74 may be better understood by reference to FIGS. 5 and 6. Considering first FIG. 5, the waveform indicated at 76 represents the signal appearing on the line 58 and consists of a series of voltage pulses 78, 78 which are produced as the result of the binary digit representation appearing in the associated position of the output register being switched between its zero and one conditions. For convenience in FIG. 5, the voltage levels have been identified in accordance with the binary digit represented thereby. That is, the indicated one level is the level used to represent a binary digit one and the indicated zero level is that used to represent the binary digit zero. The decoder 74 is responsive to the pulses 78, 78 to change the energization scheme of the motor windings from one step to the next in response to each pulse as it is received. The signal appearing on the line 60 is represented in FIG. 5 at 80, and the decoder 74 is responsive to the signal to determine which of two possible sequences the change in energization effected by the pulses 78, 78 will follow, one sequence being that which causes operation of the motor in the clockwise direction and the other sequence being that which causes operation of the motor in the counterclockwise direction. In FIG. 5, the signal 80 remains constantly at the one level and, therefore, during the time period illustrated the motor is operated in only the one direction dictated by such one level of this signal.

At the initial or zero time moment of FIG. 5, the coil A is energized. At the appearance of the first pulse 78 thereafter the coil A is deenergized and the coil B energized. At the appearance of the next pulse 78, the coil B is deenergized and the coil C is energized, and at the appearance of the next pulse 78, the coil C is deenergized and the coil D is energized. This same sequence is then followed for the next four received pulses and the process is repeated for so long as the signal 80 remains at the one level and pulses 78, 78 appear on the line 58. Therefore, as a result purely of the changes in the binary representations appearing in the position of the output register connected with the lines 58 and 60, the motor is caused to operate. It will also be obvious that the operating speed of the motor is determined by the time period existing between the pulses 78, 78 transmitted to the X motor decoder and used by the decoder to sequentially change the energization of the motor windings. By increasing the time period between the pulses the motor speed may be slowed and by decreasing the time period between the pulses the motor speed may be increased.

FIG. 6 is similar to FIG. 5 except for the signal 80 appearing on the line 60 now being at the zero level rather than at the one level as in FIG. 5. Accordingly, in response to this zero level of the signal 80, the decoder 74 operates to energize the motor windings in a reverse sequence to obtain rotation of the motor in the opposite direction. That is, from FIG. 6, it will be noted that the sequence of coil energization is A, D, C, B, rather than A, B, C, D as in FIG. 5.

The components associated with the Y axis of the FIG. 2 system are similar to those of the X axis. More particularly, they include a decoder 82 which is similar to the decoder 74 except for being connected to two other positions of the output register through the lines 62 and 64 rather than the lines 58 and 60. The output of the decoder 82 is in turn connected with the motor 40 so as to control the energization thereof through power amplifiers 84, 84, the decoder 82 being responsive to changes in the signal appearing on the line 62 to change in a step-by-step fashion the energization of the windings of the motor 40 and responsive to the signal appearing on the line 64 to control the direction of such change.

The clock 52 of the computer 22 controls its rate of operation and insofar as a predetermined number of clock cycles are required to perform a given calculation such calculation will require a predetermined amount of time. Actually, the appearance of each output pulse such as the pulse 78 of FIG. 5 which causes the motor to advance one step involves a series of calculations made by the computer, and these calculations require a certain number of clock cycles, that is a certain amount of computer operating time. Nevertheless, the rate of the clock 52 is usually so fast that the computer is capable of generating stepping or advance commands, such as the pulses 78, 78 at a much faster rate than the step motor 38 or step motor 40 is capable of accepting and responding to them. In accordance with the invention, therefore, a means is employed for slowing the rate of generation of advance commands, and this means comprises a series of wait loops stored in the computer memory 54 at least one of which wait loops is executed by the computer, under instructions from the master program also stored in the memory 54 following each advance command in order to delay the appearance of the next advance command. That is, each wait loop is a routine to be carried out by the computer and is one which requires a relatively large number of clock cycles. Any number of wait loops of different time duration may be used as desired, but FIG. 7 by way of example shows four different wait loops 86, 88, 90 and 92 each requiring different amounts of time for the computer to execute.

The use of wait loops, such as those shown in FIG. 7, in the programming of the computer not only allows the advance commands to be made at a rate compatible with the stepping rate of the stepping motors but also provides a convenient way for controlling the speed of such motors. FIG. 8, for example shows on a time scale the operation of the computer as it operates to drive one of the motors at a relatively slow speed. In this figure, the blocks marked A and indicated at 94, 94 are periods during which advance commands are calculated and executed. That is, during each of the periods 94, 94 one pulse, such as one of the pulses 78, 78 of FIG. 5, is calculated and produced on the associated output line 58. Following each of the advance periods is a wait loop 86 which is of relatively long time duration so that the advance commands are spaced by a considerable time period from one another to cause the motor to be rotated slowly.

FIG. 9, on the other hand, shows a program sequence used to operate a motor at a higher rate of speed than that shown in FIG. 8. In this figure, the periods 94, 94 are again advance periods during which advance commands are generated and executed, and between each of these advance periods is a wait period 92 which is of a relatively shorter duration than that of the wait periods 86, 86 used in FIG. 8. Therefore, the advance periods 94, 94 of FIG. 9 are more clearly spaced to one another and cause the motor to be operated at a faster speed.

From FIGS. 7, 8 and 9, it will be appreciated that by properly selecting the wait loops used between advance periods the motor speed may be closely controlled. In fact, by proper selection of the wait loops any desired speed versus time characteristic may be formed as the motor is driven between two end points, and various different linear or non-linear up-ramps or down-ramps in the speed versus time characteristic may be generated and employed during the initial starting phase and terminal stopping phase of the motor operation between two end points in order to match the acceleration and deceleration loads to the torque versus speed characteristic of the motor in order to obtain optimum performance from the motor. FIG. 10, for example, illustrates a scheme which may be used to gradually increase the speed of the motor from a low speed to a higher speed. In accordance with this scheme the first advance periods are spaced from one another by long wait loops 86, 86 causing the motor to first rotate at a slow speed. Following this, the advance periods are followed by slightly shorter wait periods 88, 88 which cause the motor to rotate at a slightly faster velocity. After operation for some time at this velocity, the advance periods are next followed by still shorter wait periods 90, 90, and finally after operation for some time at this velocity the advance periods are followed by the yet shorter wait periods 92, 92. In this figure, each bracket 96 represents a series of advance periods and wait loops similar to that located on its left and which are executed prior to the execution of the advance period and wait loop immediately following it on the right. From FIG. 10, it will therefore be apparent that by properly selecting the number of times a given wait loop is used before proceeding to the next shorter wait loop, that is before proceeding to the next higher motor velocity, and by using a larger number of wait loops of different time duration than the four shown in FIG. 7, any desired up-ramp of velocity of a linear or non-linear character may be produced during the initial portion of the operation of the motor between two end points. Therefore, the acceleration of the motor may be controlled so as to maintain the acceleration loads imposed on the motor closely matched to the available torque versus speed characteristic of the motor to obtain an optimum output therefrom, this usually requiring a non-linear up-ramp of the velocity — that is a non-linear appearance of the velocity versus time characteristic as the motor is accelerated from a zero or low velocity to a maximum velocity. Similarly, it will be obvious from FIG. 10 that the reverse procedure may be used during the final or stopping phase of the motor, as it is driven between two end points, to produce a down-ramp in the motor velocity. That is, during such down-ramp the wait loops used are progressively changed to longer and longer duration ones so that the speed of the motor is gradually reduced, and again the shape of the down-ramp may be linear or non-linear, a close matching of the motor torque versus speed characteristic usually resulting in a non-linear down-ramp.

Although the invention has been shown in FIGS. 1 and 2 as applied to a two axis system employing two stepping motors each controlled by the computer, it will be understood that the invention is not so limited. Instead, it may be employed for driving a single motor such as used for example to position a valve in an automatic process control system supervised by the computer. Also, of course, more than two motors may be controlled by the same computer, if desired. For example, three motors might be controlled by the same computer in a three axis drive system wherein a driven part is driven under computer control not only in the X and Y coordinate directions but also in a Z or θ coordinate direction as well. In the system illustrated, where the two motors 38 and 40 control the motion of a single device, the pen 30, in two different coordinate directions so as to cause the pen to move along a given desired line lying in the plane of such axes, the advance commands generated for one axis must, of course, be coordinated with those generated for the other axis so that the pen as moved will move at the required slope angle. This coordination function is performed by the computer 22 as illustrated in FIG. 1, but by itself does not form any part of this present invention.

Turning now to FIG. 11, this figure shows in block diagram form another system which may be used in practicing the invention. This system is similar to that of FIG. 2 except for omitting the X and Y motor decoders 74 and 82. Parts of the system of FIG. 11 which are the same as corresponding parts of the system of FIG. 2 have accordingly been given in FIG. 11 the same reference numerals as in FIG. 2 and need not be redescribed.

Considering the X axis step motor 38 of FIG. 11, this motor, as shown in FIGS. 3 and 4, has four windings A, B, C and D each connected with a respective one of the four power amplifiers 72, 72. Each power amplifier 72 is in turn connected by an associated line 98 to a respectively associated position of the output register 56. That is, the output register 56 has four positions exclusively devoted to the four windings of the X axis motor 38. A particular winding of the motor 38 is therefore energized or unenergized depending on the nature of the binary representation appearing in its associated position of the output register 56. If the voltage signal appearing in the associated register position is zero, the associated winding is unenergized, and if the voltage is at a level representing the binary digit one the winding is energized. Accordingly, it will be understood from FIG. 11 that the X motor 38 may be controlled by causing the four position word appearing in the output register and associated with the associated four lines 98, 98 to change in the proper sequence so that the windings of the motor are energized in the sequence A, B, C, D or A, D, C, B depending on the desired direction of rotation and, of course, this word change, is produced directly by the operation of the computer.

Likewise, the Y axis motor 40 of FIG. 11 has its four windings connected to the four power amplifiers 84, 84, each of which in turn is connected by the respective one of the lines 100, 100 to a respectively associated one of four other positions of the output register 56, and by changing this four position word in the proper manner, the motor 40 may be caused to operate in one or the other direction as desired. In comparing the system of FIG. 11 with the system of FIG. 2, it will be understood that in FIG. 2 an advance command for the X motor consists of a single pulse appearing on the output line 58, and each time such pulse appears the motor will be shifted one increment, the direction of rotation being determined by the signal on the line 60. In the FIG. 11 system, on the other hand, an advance command for the X motor consists of a change in the four Binary Bit word associated with the four lines 98, 98, with each increment of motion requiring a word change and with the direction of rotation being determined by the nature of the word change rather than by an independent directional signal. In the system of FIG. 11 the word changes required to rotate the motors in the desired directions and at the desired speed are, of course, computed by the computer, and a wait loop is executed following each word change to reduce the rate of such word changes and to control the velocity of the motor in the same manner as discussed above in connection with the FIG. 2 system. Also in regard to FIG. 11, it should be understood that the illustrated motors 38 and 40 and the described sequencing schemes pertaining thereto have been shown by way of example only, and that other types of motors and other sequencing schemes may be employed instead of those illustrated without departing from the invention.

I claim:

1. A step motor control system comprising a step motor having a plurality of windings and which is operable in one direction by changing the energization scheme of said windings in a step-by-step manner in a given sequence, an input device for supplying input information, a computer connected with said input device and operable to process said input information and to calculate results therefrom, said computer having an output register in which said results appear as binary coded output words, said output register having at least one bit position thereof dedicated to the sequencing of said step motor windings, and means connected between said plurality of windings of said step motor and said output register for energizing said plurality of windings and for changing their scheme of such energization from one step to the next step of said sequence directly and solely in response to each change in the output word appearing in said at least one dedicated bit position of said output register.

2. A step motor control system as defined in claim 1 further characterized by said at least one dedicated bit position of said output register being one dedicated bit position of said register in which a binary digit appears in the form of a voltage signal having a first value representing one value of said digit and a second value representing the other value of said digit, and said means connected between said plurality of windings of said step motor and said output register including a decoder connected between said one dedicated position of said output register and said plurality of windings and operable to change the scheme of energization of said indings from one step to the next step of said sequence each time the voltage signal appearing in said one dedicated position of said output register shifts from said first value to said second value.

3. A step motor control system as defined in claim 1 further characterized by said motor being operable in an opposite direction by changing the energization scheme of said windings in a step-by-step manner in a second sequence different from said given sequence, said at least one dedicated bit position of said output register being one dedicated bit position of said register and said register including an additional bit position in each of which bit positions appears a binary digit in a form of a voltage signal having a first value representing one value of said digit and having a second value representing the other value of said digit, and said means connected between said plurality of windings of said step motor and said output register including a decoder connected between said two bit positions of said output register and said plurality of windings and operable to change the scheme of energization of said windings from one step to the next step of said given sequence when the voltage signal appearing in said dedicated bit position shifts from its said first value to its said second value while the voltage signal appearing in said additional bit position is of its said first value and to change the scheme of energization of said windings from one step to the next step of said second sequence when the voltage signal appearing in said dedicated bit position shifts from its said first value to its said second value while the voltage signal appearing in said additional bit position is of its said second value.

4. A step motor control system as defined in claim 1 further characterized by said step motor having a plurality of input terminals through which said plurality of windings are energized, said at least one bit position of said output register consisting of a plurality of bit positions, equal in number to the number of said input terminals, each assigned to a respective one of said input terminals of said step motor and in each of which appears a binary digit in the form of a voltage signal having a first value representing one value of said digit and a second value representing the other value of said digit, and means connected between each of said plurality of dedicated bit positions of said output register and its associated one of said input terminals of said step motor for supplying electrical power to such input terminal when the voltage signal appearing in the associated one of said plurality of positions of said output register is of said first value and for removing the supply of electrical power to such input terminal when the voltage signal appearing in the associated one of said plurality of positions of said output register is of said second value.

5. A step motor control system as defined in claim 1 further characterized by said being a general purpose computer.

6. A step motor control system as defined in claim 1 further characterized by said computer including a clock for timing its operation and a program means for controlling the functioning thereof in accordance with a predetermined program which is independent of said means for energizing said step motor windings so that the rate at which the output word appearing in said at least one dedicated bit position of said output register is changed to cause changes in the energization scheme of said windings is dependent solely on the input information supplied by said input device, on the rate of said clock and on said predetermined program of said program means.

7. A step motor control system as defined in claim 6 further characterized by said computer including a memory having at least one wait loop routine stored therein, and said predetermined program of said program means being such that at least one wait loop routine from said memory is executed following each change in the output word appearing in said at least one dedicated bit position of said output register which causes a change in the energization scheme of said windings so as to provide a delay between said change and the next such change.

8. A step motor control system as defined in claim 1 further characterized by a second step motor having a plurality of windings, said second step motor being operable in one direction by changing the energization scheme of its said windings in a step-by-step manner in a given sequence, said output register having at least one bit position thereof dedicated to the sequencing of said second step motor windings and means connected between said plurality of windings of said second step motor and said output register for energizing said latter plurality of windings and for changing their scheme of energization from one step to the next step of said latter sequence directly and solely in response to each change in the output word appearing in said at least one bit position of said output register dedicated to the sequencing of said second step motor windings.

9. A step motor control system as defined in claim 8 further characterized by means providing a first part movable relative to a second part in two coordinate directions, means connecting said first mentioned step motor to said first part for moving it relative to said second part in one of said two coordinate directions in response to operation of said first mentioned step motor, means connecting said second step motor to said first part for moving it relative to said second part in the other of said two coordinate directions in response to operation of said second motor.

* * * * *